Oct. 28, 1958 N. A. MURRAY 2,857,801
FLAME PHOTOMETER
Filed Feb. 23, 1955 5 Sheets-Sheet 1

INVENTOR.
Nelson A. Murray,
BY Paul & Paul
ATTORNEYS.

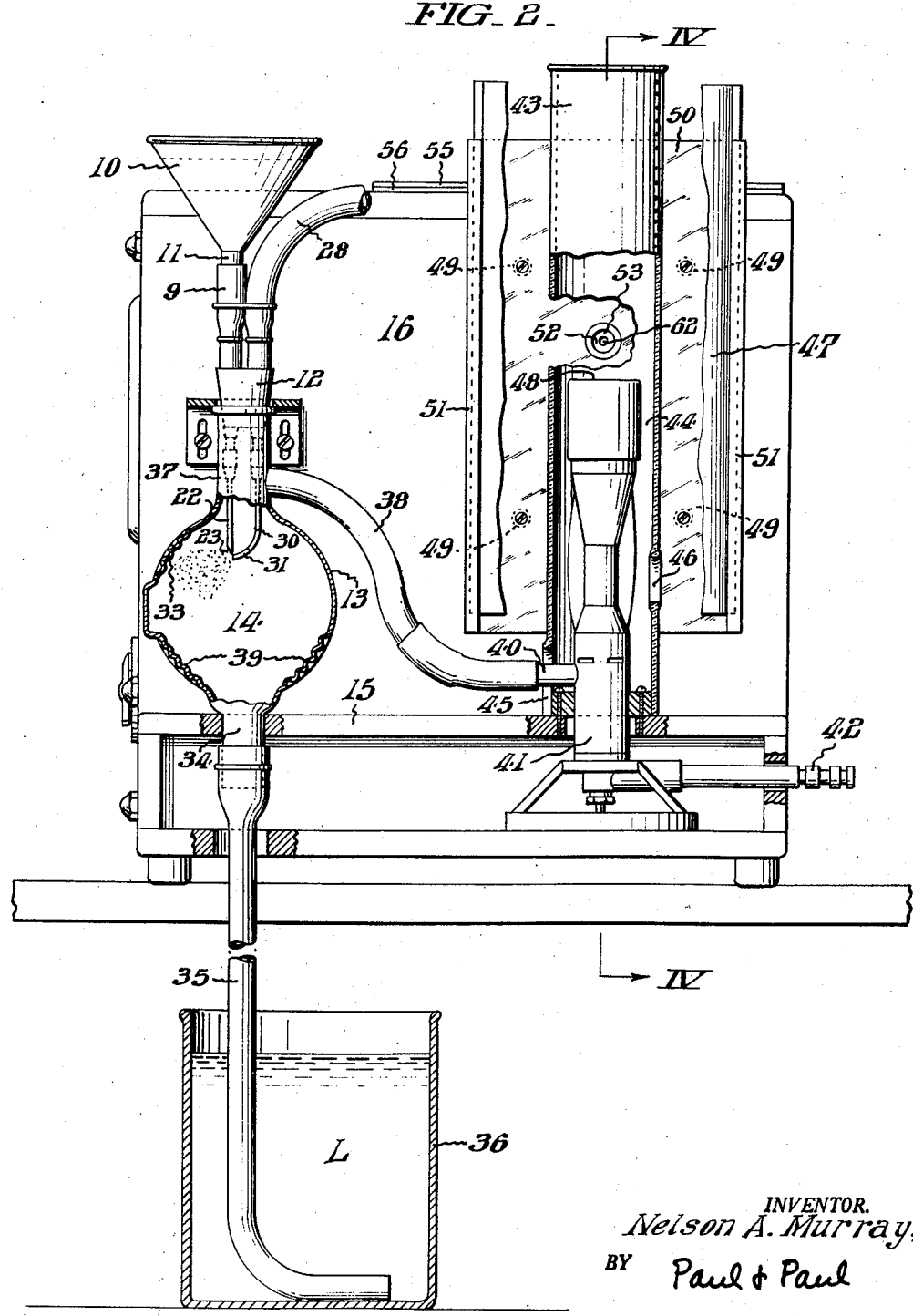

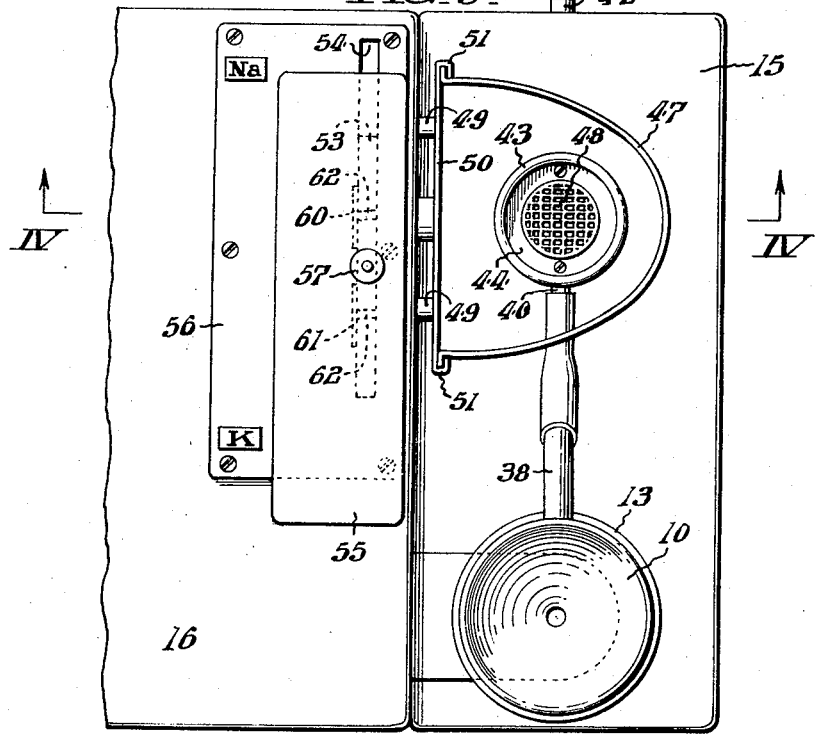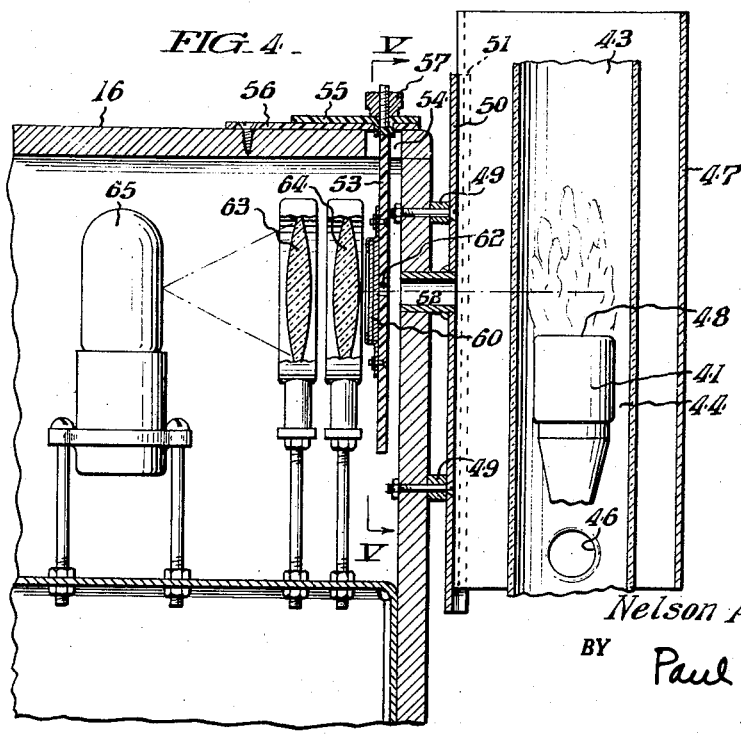

Oct. 28, 1958

N. A. MURRAY 2,857,801

FLAME PHOTOMETER

Filed Feb. 23, 1955

INVENTOR.
Nelson A. Murray,
BY Paul & Paul
ATTORNEYS.

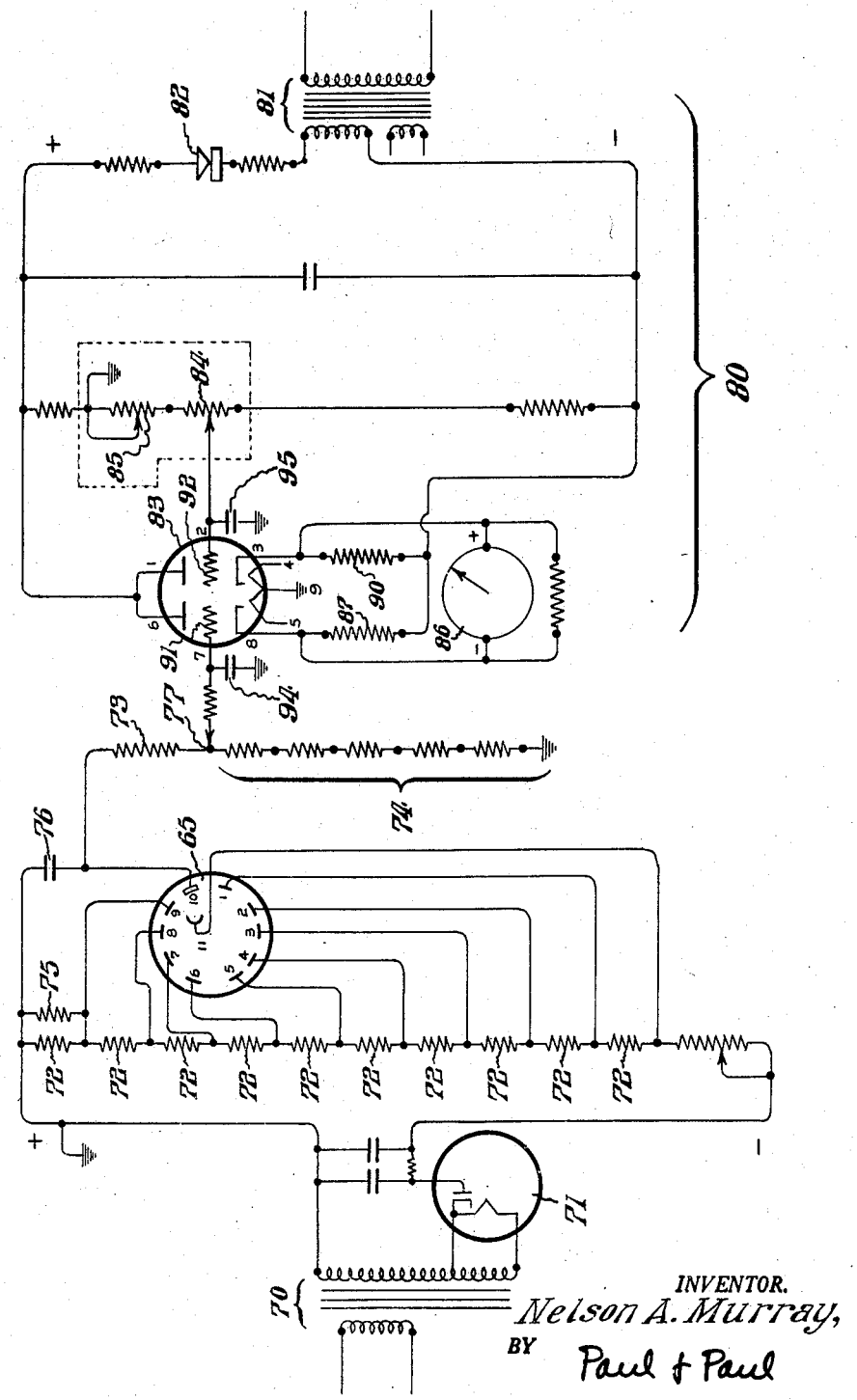

United States Patent Office 2,857,801
Patented Oct. 28, 1958

2,857,801

FLAME PHOTOMETER

Nelson A. Murray, Jacksonville, Fla.

Application February 23, 1955, Serial No. 489,978

3 Claims. (Cl. 88—14)

This invention relates to an apparatus for measuring the spectrum emission of a material, and further concerns an apparatus for the qualitative or quantitative measurement of spectrum emission intensity. More particularly, the invention concerns an apparatus for determining the proportions of potassium or sodium or other equivalent metals which are present in a liquid sample, or present in such a state that they may be introduced into a flame.

It is well known that atoms or molecules, when excited by heat, emit light of characteristic wave lengths, and that the intensity of the emission is a function of the quantity of the substance present. For example, different elements, when present in a flame impart different colors to the flame. The sodium flame is yellow and the potassium flame is purple, while other metals give characteristic spectrum emissions which are well known.

The phenomenon of spectrum emission is utilized in one form of quantitative analysis. A sample may be placed in the flame of an ordinary Bunsen or Fischer burner, which burns a gaseous fuel such as natural or artificial gas, acetylene, etc. This principle has been commercially utilized in the form of flame photometers and flame spectographs. These devices are also useful in determining the quantities of various elements present, particularly metals or metal compounds. The substance to be analyzed is fed into the flame, preferably in liquid form or in solution under controlled conditions, and the operator measures the intensity of the emitted light characteristic. Since the intensity of the light characteristic is proportional to the quantity of the substance present, the quantity may readily be calculated.

Light intensity is conventionally measured using a photosensitive cell which activates a galvanometer or other indicating device. The photosensitive cell may be sensitive to light of the particular wave length under consideration, or a suitable monochromator or filter may be used. This method of analysis is very rapid and is highly advantageous for that reason.

It is an object of this invention to provide an instrument of the character indicated above which is extremely simple to operate and maintain and which provides a means for making a rapid analysis without sacrificing accuracy. Another object of this invention is to provide a spectrum analysis apparatus for measuring the concentration of a soluble metal salt such as sodium or potassium in an aqueous solution. Still another object of this invention is to provide a spectrum analysis apparatus which accurately measures minute traces of metals or other materials in solution. Still another object of this invention is to provide an apparatus of the character indicated which has excellent stability and reliability. Other objects and advantages of this invention, including light weight and small size of the apparatus as well as the simplicity, economy and portability of the same, will further become apparent hereinafter and in the drawings whereof:

Fig. 2 represents an end view of the flame photometer shown in Fig. 1 with certain parts broken away and others shown in section, in order more particularly to illustrate important details;

Fig. 3 represents a partial plan view of the flame photometer, taken as indicated by the lines and arrows III—III which appear in Fig. 1;

Fig. 4 represents a partial sectional view taken as indicated by the lines and arrows IV—IV which appear in Figs. 2 and 3;

Fig. 7 represents a wiring diagram illustrating the electronic means for measuring the intensity of a spectrum emission in accordance with this invention.

Figure 1:
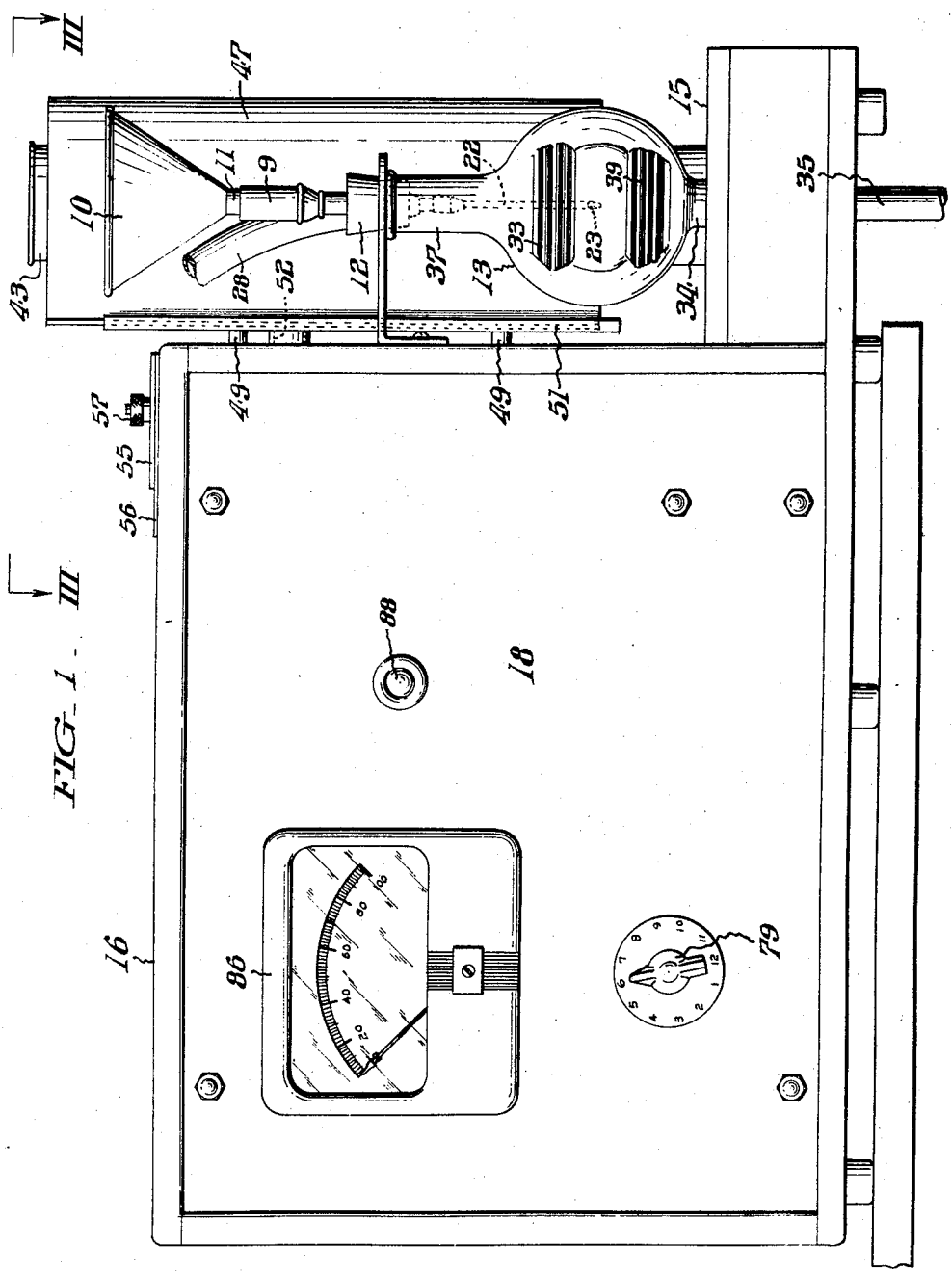
Fig. 1 represents a front elevation of a flame photometer embodying features of this invention.

Turning now to the specific embodiment of the invention illustrated in the drawings, the liquid test sample is introduced into a funnel 10 which has a vertically extending stem 11. The stem 11 is connected by a rubber tube 9 to a metal tube 19 which extends through stopper 12. The latter fits into a generally spherical container or fog chamber 13 forming a substantially enclosed space 14. The fog chamber 13 is supported on a shelf 15 of an adjacent cabinet 16, which is preferably wood or other non-conductor of electricity provided with a metalized coating or lining rendering its surface electrically conductive. Cabinet 16 includes a metal front panel 18.

Figure 6:
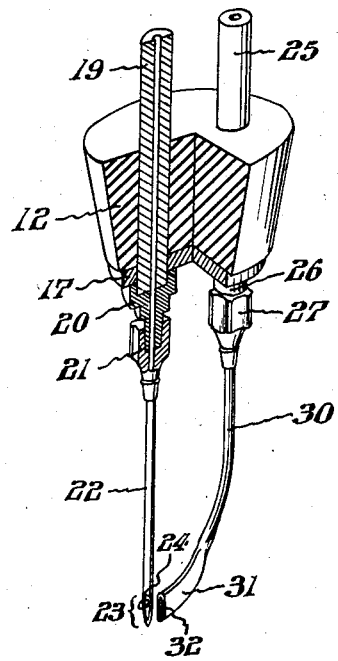
Fig. 6 represents a view in perspective, with a part cut away and shown in section, of the liquid feed means and liquid fogging means which constitutes an important feature of this invention.

Referring more particularly to Fig. 6 of the drawings, it will be apparent that a plate 17 is adjacent to the bottom of stopper 12 and that the fitting 20 is fixed to the plate 17, into which a tube 19 is inserted. Another fitting 21 carrying a tube 22 is adjustably attached to fitting 21. The fittings 20, 21 are centrally bored to establish fluid communication between the funnel stem 11 and the tube 22. Tube 22 terminates at an inclined portion 23 (Fig. 2) which has a generally elliptical opening 24. Tubes 19 and 25, fittings 20 and 26 and plate 17 are all one integral unit, and this unit is held by the friction of tubes 19 and 25 against the sides of the holes in the stopper 12.

Also extending through the stopper 12 is a tube 25 which carries compressed air or any other combustion supporting gas which is connected to an air hose 28 and may be pressurized by any conventional means, not shown. The compressed gas flows through the plate 17 and through fittings 26, 27 to a curved tube 30 which has a flattened and restricted end portion 31 terminating in a generally elliptical opening 32.

The tubes 22, 30 may be of any desired type or diameter, but standard hypodermic needles have been found particularly useful.

It will accordingly be appreciated that when compressed air or equivalent combustion supporting gas is projected at high velocity from the restricted end portion 31 of the curved tube 30, immediately adjacent to the open end of the tube 22, the liquid dropping from the tube 22 is dispersed in the gas forming a fog in the fog chamber 13. Referring more particularly to Figs. 1 and 2, it will be observed that the wall of the fog chamber 13 has an inside surface having a plurality of steps 33 formed therein, which steps are arranged in the path of the fog and comprise baffles assisting the dispersion of the liquid in the air. The steps 33 may be formed by heating the glass fog chamber and pressing a suitable form against its outside surface. Other means will readily be apparent. The baffles cause the larger droplets of spray to fall downwardly to the bottom of the fog chamber 13. Additional baffles 39 prevent the spray from assuming a rotary motion and from climbing up the side of the fog chamber and entering the outlet which will further be described.

The fog chamber 13 has a tube 34 at its bottom which is connected to a drain 35 terminating under the surface of liquid L in a container 36 which is located below the bottom of the fog chamber 14. The larger fog droplets, which are separated from the small droplets in the fog chamber, accumulate at the bottom and are carried off by the drain 35. The liquid L provides necessary hydrostatic back pressure and prevents siphoning.

Extending from the neck portion 37 of the fog chamber 13, at a location above the open ends of the tubes 22, 30, is a fog delivery tube 38 which conducts the small fog droplets (which have not been separated out in fog chamber 13) into an air inlet pipe 40 of a gas burner 41. The gas burner 41 may be of any desired type, such as a Fischer burner for example. A combustible gas, such as propane or the like, is introduced into the burner 41 through a gas inlet pipe 42. It will be appreciated that the gas mixes with the fog inside the burner and that the mixture is burned at the top of the burner 41, since the fog contains a combustion supporting gas. The resulting flame emits light spectra which have the characteristics of the metals or other materials contained in the fog.

Means are provided for controlling the burner flame and for introducing secondary air for the combustion thereof. A vertical chimney 43 surrounds the body of the burner 41 and is spaced therefrom, providing an intervening space 44. Chimney 43 may be glass or any other light-transmitting material which transmits the light wave lengths under consideration. Adjacent to its base the chimney 43 has an opening 45 which is in communication with the surrounding atmosphere, and another opening 46 is provided in the chimney slightly above its base, also in communication with the surrounding atmosphere. The top of the chimney 43 is considerably above the top of the burner 41, thereby providing a substantial draft which draws air into the chimney through the openings 45, 46 from the surrounding atmosphere. A light excluding shield 47, of generally semi-circular cross section, is supported by the cabinet 16 in a position surrounding the chimney 43. The base of the shield 47 is spaced above the base of the chimney 43. A substantially flat, heat reflective plate 50 is parallel to and spaced from the adjacent wall of cabinet 16 by spacers 49, and has end guideways 51, 51 in which the ends of the shield 47 are retained. Heat reflector plate 50 may consist of polished aluminum or equivalent. The shield 47 is vertically slidable in the guideways 51, 51.

Formed in the cabinet 16 and in the heat reflecting plate 50 is a small opening 52 (Fig. 4) through which the light from the burner flame enters the casing. The opening 52 is located in line with the purest part of the flame and is so located to exclude flame cones directly adjacent the grid 48 on the top of burner 41.

Figure 5:
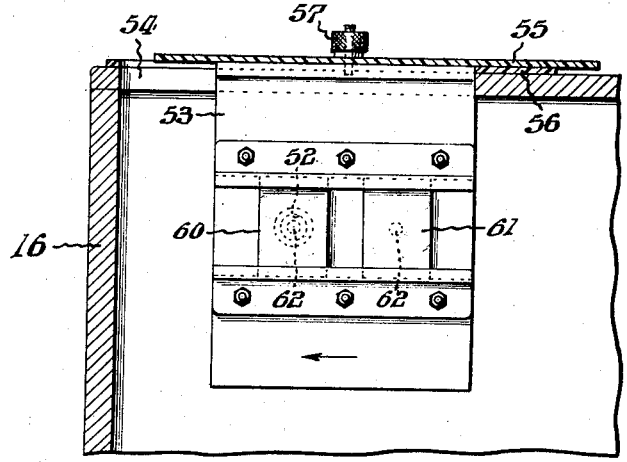
Fig. 5 represents a sectional view taken as indicated by the lines and arrows V—V which appear in Fig. 4.

Referring more specifically to Figs. 3–5 of the drawings, a vertically arranged filter carrier slide plate 53 is horizontally reciprocable below a slot 54 formed on top of the cabinet 16 adjacent the side wall thereof. The slide plate 53 is suspended from a wear strip 55 which is slidable with respect to a similar strip 56 fixed to the top of the cabinet 16. A knob 57 is connected to the plate 53 for convenience of manipulation. The slide plate 53 carries a pair of spaced apart sets of light filters 60, 61 which filter out light of undesirable wave lengths and render the transmitted light substantially monochromatic. To render the light monochromatic, simple or compound filters may be used depending upon the character of the light source, the photoemissive qualities of the sample being analyzed, and the sensitivity of the photosensitive device. The filter 61 is intended to isolate the sodium spectrum and preferably comprises the combination of a 61N Wratten filter and a 22E2 Wratten filter. These filters are cemented together with a transparent plastic cement which enhances the light transmissive qualities of the filter combination. The filter 60 is intended to isolate the potassium spectrum, and preferably comprises a combination of Wratten 89B filter with a 5 mm. thickness of didymium glass. Equivalent filters may be substituted, and are preferably cemented together with a transparent plastic cement for maximum light transmission. It will be appreciated that by manipulating the knob 57 either the sodium filter 61 or the potassium filter 60 may be brought in line with the aperture 52, thereby selectively admitting either the sodium or potassium emission into the cabinet 16. The plate 53 has a pair of small apertures 62 each being centrally located with respect to the corresponding light filter 60 or 61. Apertures 62 regulate the amount of light admitted to the photosensitive portion of the apparatus, which will now be described.

The members 63, 64 are condensing lenses or converging lenses which are mounted within the casing 16 in line with the aperture 52. A photosensitive cell 65, preferably a photomultiplier tube, is mounted within the cabinet 16 in such a position that the emission transmitted by the lenses 63, 64 is focused on the light sensitive portion of the cell 65. The photosensitive cell 65 is connected electrically to an electronic measuring device as shown in Fig. 7 which constitutes a means for measuring the intensity of the light emission.

Turning now to Fig. 7 of the drawings, the number 70 designates an alternating current transformer which is connected through a rectifier 71 and through a plurality of equal resistances 72 into the various dynodes of the photomultiplier tube 65. Preferably the photomultiplier tube 65 is a 1P28 tube or equivalent. As shown in Fig. 7, the photomultiplier tube 65 has a photocathode 11 combined with nine dynodes identified by the numbers 1–9 which cause the electrons and secondary electrons to cascade through the nine dynode stages to the collector anode 10. As a result of this series of secondary-emission multiplications, an overall gain of approximately 1,000,000 may be produced at 100 volts per dynode stage. The collector anode 10 is connected through a resistor 73 to an input resistor network 74. It is to be observed that the resistance from dynode 9 to the ground is reduced to half the value of the resistance 72 by the addition of another resistor 75 having a resistance value equal to the resistors 72. It will also be noted that a capacitor 76 is interposed between the collector anode 10 and the ground. This is an important and advantageous feature of the invention and imparts remarkable stability to the instrument. The capacitor 76 may be considered as being shunted across the voltage divider input at 77.

The number 80 comprehensively designates an electronic bridge which is powered by an alternating current transformer 81 though a selenium rectifier 82. A twin triode 83 has one grid connected into the coarse adjustment voltage divider 84 which in turn is connected through a fine adjusting means 85 between the positive and negative sides of the filtered, direct current plate power supply. A microammeter 86 is connected to the cathodes of the twin triode 83. The member 87, 90 are resistors which are connected as illustrated between the cathodes of the twin triode and the transformer 81. It will accordingly be appreciated that, as different amounts of energy impinge on the photomultiplier cell 65, differences in potential are in evidence across the input resistor network 74 of the electron bridge 80. This difference in input signal is recognized by grid 91 of twin triode 83. Since the signal input to grid 92 of twin triode 83 is governed by the power supply, and this reference voltage is constant after being set, the two sides of the bridge circuit are thrown out of balance by the changes of signal at grid 91. This difference appears at the two cathodes of the twin triode 83 and is measured by the microammeter 86. The potential difference is proportional to the differences in amount of the substance being atomized into the flame per unit of time, all other factors being equal. Accordingly, by running suitable standard solutions immediately before and after the unknown solution, the actual concentration of the unknown solution is readily determined by arithmetic interpolation. The stability of the electronic bridge is increased by bypassing grid 91 and grid 92 with capacitors 94, 95 of suitable values.

The metalized cabinet 16, in combination with the metal panel 18, completely shields the electronic circuitry from stray currents and capacities as may be present.

It will be appreciated that the resistor 73 plus resistor 74 has a very high value, of the order of 10 megohms or more, and this is of advantage in that the photomultiplier output is read as a difference in potential change across a very high value resistor, rather than a difference in current generated by the photomultiplier cell. This is a highly advantageous feature of this invention.

The face of the microammeter 86 is visible at the front of the cabinet 16 (Fig. 1), and the adjusting knob 79 of the electronic circuit is located below the microammeter. This knob governs the fine adjustment device 85, and the coarse adjustment device 84. The two adjustment devices may be incorporated in a single control for mechanical simplicity. The sensitivity selector switch controlling the relation of grid 91 with the resistors of the input resistor network 74 at 77 is placed inside the cabinet. The number 88 refers to a pilot light jewel.

The present detection system employs a photomultiplier cell which is extremely sensitive to energy of certain wave lengths, so that minute traces of material in solution may be analyzed. Since the burner derives a portion of its combustion supporting gas from the adjacent atmosphere, it is necessary that this atmosphere be relatively free of suspended impurities.

In this invention the flame employed as an energy source is surrounded by the adjacent atmospheric air only. The gas within the chimney and below the flame itself is identical with the adjacent atmosphere. In addition to the adjacent atmospheric air in the lower portion of the chimney (below the flame) there are other materials in the chimney at the level of and above the flame. These are: (1) unburned combustible gas, for instance fuel, (2) combustion-supporting gas (compressed air from the atomizer), (3) combustion-supporting gas (from adjacent atmosphere), (4) vaporized material to be analyzed. There is no blanketing of the flame by any material other than the surrounding atmosphere in the chimney. The chimney is open at the bottom and the top, and is used for mechanical purposes only; i. e. (1) to conduct heat upward and away from the instrument, (2) to provide a draft for the flame, (3) to prevent outside air currents from impinging directly on the flame.

The combustion supporting gas which is forced into the burner under pressure along with the atomized material under analysis may be purified by standard methods, such as beds of silica gel, aluminum oxide, or electrostatic precipitators. Standard air conditioning is quite helpful and is adequate for most purposes.

The substances to be analyzed may be introduced into the flame in any of several ways, as feeding it directly into the flame, feeding it into the gaseous fuel in the burner fuel intake, or feeding it into the air intake of a conventional blast burner (Fischer type) after proper mixing and atomizing in a fog chamber. Of course, any combination of these methods may be used.

It will be noted that in any of the above methods or any combination of these methods of feeding the material to be analyzed into the flame, it is still necessary to have the burner chimney open at the bottom, and in direct contact with the adjacent atmosphere. This is a prerequisite for operation, and the burner will not function otherwise.

A preferred method is to introduce the substance to be analyzed into a combustion supporting gas through an atomizer arrangement and feed the combustion supporting gas and sample mixture into the air intake of a blast type laboratory burner, as shown in the drawings. The gas-sample mixture is excluded from the space between the flame and the chimney below the level of the flame. In this manner the gas in the chimney below the flame is made up only of the gas in the adjacent atmosphere.

In order for this type of burner arrangement to function properly a prerequisite is that the bottom of the chimney shall have one or more openings connecting the inside of the chimney with the surrounding atmosphere. The gas within the chimney and surrounding the flame is of the same composition as the adjacent atmosphere and is at approximately the same pressure.

The burner per se in this instrument is the Fischer blast type and no claim is made for its invention. However, to function in the present apparatus the burner shall be a type which operates at a pressure exceeding the normal atmospheric pressure at its air intake. When such a burner is incorporated in the apparatus of this invention, it is necessary that the flame be supplied with the surrounding atmospheric air (combustion supporting gas) in order that the fuel introduced into the burner be most completely burned. The mixture of atomized sample and combustion supporting gas is forced into the air intake of the blast type burner under increased pressure. The combustion supporting gas is driven into the air intake of the blast type burner along with the sample to be analyzed and provides part of the oxygen for supporting the combustion. Additional oxygen for the supporting combustion is supplied from the surrounding atmospheric air and is drawn upward into the chimney and into the flame by the slightly negative pressure created by the flame on the lower part of the open chimney. It is also possible to employ a short chimney surrounding the flame only. However, the chimney, no matter what length, is open at the base and in contact with the surrounding atmospheric air. The only material entering the chimney from the outside of the burner is the combustion supporting gas of the adjacent atmosphere. In using the blast burner it is desirable that the chimney extend practically the entire length of the burner and be extended several inches above the top of the burner so that the atmospheric air adjacent to the chimney can be drawn upward into the chimney by the slightly negative pressure created by the flame. The purpose of this chimney is mechanical only and it supplies a slight draft to the flame and serves as a mechanical barrier to prevent small air currents from blowing directly into the flame.

The purity of the combustible gas in the chimney surrounding the flame is governed by the purity of the adjacent atmosphere. A mechanical or chemical filter may be employed within the chimney, or suitably connected to it, to remove undesirable material from the atmosphere entering the base of the chimney. The base of the chimney must still have access to the adjacent atmosphere and must, in no case, be closed.

It is understood that the flame source of this invention may be used as a spectra generating device in other types of photoemissive and absorptive systems. It is also understood that the spectrum isolating filters may be used in combination with the other photoemissive generating devices and other photosensitive detecting apparatus. Likewise the photosensitive detection system and electronic bridge circuit in this invention may be used with other types of monochromating systems and other types of light or energy generating sources.

The flame source is particularly satisfactory for analysis of alkali metals, since, because of its relatively low temperature, other elements are not so strongly excited. However, with the proper increase in flame temperature and the proper spectral isolation of the characteristic lines of various materials, it is possible to analyze for many substances.

While I have described my invention by reference to one embodiment thereof, it will be apparent to those skilled in the art that various changes other than those referred to above may be made in the form of the device, that equivalent elements may be substituted for those illustrated in the drawings, and that certain features of the invention may be used to advantage independently of the use of other features, all within the spirit of the invention as defined in the annexed claims.

Having thus described my invention, I claim:

1. In an apparatus for spectrum analysis of a liquid sample, the combination which comprises fog forming means for mixing the sample with a combustion supporting gas to produce a fog containing droplets of various sizes, a fog and droplet separating chamber for enclosing the fog from the outside atmosphere and for separating out the larger droplets, an upright gas burner, a substantially vertical chimney surrounding said burner and spaced therefrom, said chimney extending substantially the entire length of the burner and extending a substantial distance above the top of the burner, said chimney having an opening adjacent the bottom thereof admitting combustion supporting air from the adjacent atmosphere into the space between said chimney and said burner, the bottom of the chimney being located above the bottom of the burner to provide below the bottom of the chimney an intervening space that is in direct communication with the adjacent atmosphere, shielding means surrounding said chimney for reflecting heat and excluding light, means for connecting said fog and droplet separating chamber to said gas burner for feeding the smaller droplets into said gas burner, means for excluding said smaller droplets from the space between the chimney and the burner below the level of the burner flame whereby said space is substantially free of any substances other than air from the surrounding atmosphere, means connected directly to the burner for feeding gas into said burner for admixture with said smaller droplets and combustion with said combustion supporting gas, light sensitive means adjacent to said burner and in visual communication with an area directly above said burner to detect the intensity of the burner flame, monochromating means positioned intermediate the location of the burner flame and said light sensitive means, said monochromating means including at least two separate wave length filters one of which transmits the characteristic wave length of potassium and the other sodium, and means including a slide plate joining said filters for shifting the filters to and from a position intermediate said location of said burner flame and said light sensitive means.

2. In an apparatus for spectrum analysis of a liquid sample, the combination which comprises fog means for forming a fog containing droplets of various sizes, said fog means including liquid sample feed means and a compressed air jet positioned adjacent said feed means, chamber means for enclosing said fog and separating the larger droplets from the smaller droplets and deterring the swirling of said larger droplets, said chamber means including a generally spherical wall member having a plurality of graduated steps formed on the inner surface thereof, a burner, connecting means extending from said chamber means to said burner for feeding the smaller droplets to said burner, and light sensitive means for analyzing the spectrum of the burner flame.

3. The apparatus defined in claim 2, wherein is provided drain conductor means extending from and below said chamber means and having an opening located under the surface of water contained in a container below said chamber means.

References Cited in the file of this patent

UNITED STATES PATENTS

| | | |
|---|---|---|
| 613,905 | Knetzger | Nov. 8, 1898 |
| 2,417,023 | Sweet | Mar. 4, 1947 |
| 2,428,806 | Liben et al. | Oct. 14, 1947 |
| 2,562,874 | Weichselbaum | July 31, 1951 |
| 2,572,119 | Dieke | Oct. 23, 1951 |
| 2,647,436 | Shapiro | Aug. 4, 1953 |
| 2,664,779 | White | Jan. 5, 1954 |

FOREIGN PATENTS

| | | |
|---|---|---|
| 679,452 | Germany | Aug. 5, 1939 |
| 599,190 | Great Britain | Mar. 8, 1948 |

OTHER REFERENCES

Schuhknecht: page 250 of Optik, vol. 10, No. 5, 1953.

Barnes et al.: "Flame Photometry," pages 605–611, Industrial and Engineering Chemistry (Analytical Edition), vol. 17, October 1945.